United States Patent
Mattia et al.

(10) Patent No.: US 11,646,660 B2
(45) Date of Patent: May 9, 2023

(54) ENERGETIC FIRING DEVICE BOOSTING SYSTEM VOLTAGE AS REQUIRED FOR ENERGETIC INITIATION

(71) Applicant: Action Manufacturing Company, Bristol, PA (US)

(72) Inventors: Francis Mattia, Elkins Park, PA (US); Richard Frantz, Hatboro, PA (US); Matthew Kordbegli, Philadelphia, PA (US)

(73) Assignee: Action Manufacturing Company, Bristol, PA (US)

( * ) Notice: Subject to any disclaimer, the term of this patent is extended or adjusted under 35 U.S.C. 154(b) by 32 days.

(21) Appl. No.: 17/196,707

(22) Filed: Mar. 9, 2021

(65) Prior Publication Data
US 2021/0281177 A1 Sep. 9, 2021

Related U.S. Application Data

(60) Provisional application No. 62/986,985, filed on Mar. 9, 2020.

(51) Int. Cl.
*H02M 3/155* (2006.01)
*G08B 29/04* (2006.01)

(52) U.S. Cl.
CPC ........ *H02M 3/1552* (2021.05); *G08B 29/043* (2013.01)

(58) Field of Classification Search
CPC ...... H02M 3/07; H02M 3/073; H02M 3/1552; G08B 3/10; G08B 5/36; G08B 17/06; G08B 29/043
See application file for complete search history.

(56) References Cited

U.S. PATENT DOCUMENTS

| | | | |
|---|---|---|---|
| 5,966,002 A * | 10/1999 | Barrieau | G08B 29/181 323/222 |
| 10,615,695 B1 * | 4/2020 | Pirozzi | H02M 3/1582 |
| 2012/0161516 A1 * | 6/2012 | Koshin | H01M 8/04925 307/31 |
| 2018/0130341 A1 * | 5/2018 | Feltham | H02J 7/0068 |
| 2018/0166985 A1 * | 6/2018 | Murata | H02M 3/07 |
| 2020/0402380 A1 * | 12/2020 | Barson | G08B 5/36 |
| 2021/0014950 A1 * | 1/2021 | Sengodan | H05B 45/32 |

* cited by examiner

*Primary Examiner* — Alex Torres-Rivera
(74) *Attorney, Agent, or Firm* — Douglas J. Ryder; Ryder, Mazzeo & Konieczny, LLC

(57) ABSTRACT

Energetic firing device using a boost circuit to ensure an energetic fire circuit is charged to an All-Fire voltage even if a power source is not capable of providing necessary voltage. Boost circuit may be located between power source and energetic fire circuit and increase voltage provided by the power source when enabled. Boost circuit may be located between system logic and the energetic fire circuit and generate the All-Fire voltage when enabled. The boost circuit may generate the All-Fire voltage from an enable signal and a pulse train provided by the system logic. The boost circuit may be a switching power supply that may regulate the All-Fire voltage generated. The boost circuit may be a capacitive voltage multiplier. The boost circuit may remove power from being provided to the energetic fire circuit until enabled thus reducing system power and increasing safety.

20 Claims, 2 Drawing Sheets

ENERGETIC FIRING DEVICE BOOSTING SYSTEM VOLTAGE AS REQUIRED FOR ENERGETIC INITIATION

PRIORITY

This application claims the priority under 35 U.S.C. § 119 of Provisional Application Ser. No. 62/986,985, filed on Mar. 9, 2020, entitled "A Method for Boosting System Voltage as Required for Energetic Initiation" and having Francis Mattia, Richard Frantz and Matthew Kordbegli as inventors. Application No. 62/986,985 is incorporated herein by reference in its entirety.

BACKGROUND

System designs that incorporate energetics are often characterized by an "All-Fire" voltage. The All-Fire voltage is a minimum voltage required to successfully activate the energetics and initiate the system or device. Energetic systems/devices (e.g., one-shot devices) are unique in that they only need to function one time. These devices can sit in storage for many years before they are used. After being dormant for a long period of time, they must be ready to become operational without any periodic testing or maintenance. When finally activated they need to properly function without delay or other startup issues. It is important to ensure that the voltage available to the energetics remains greater than the All-Fire voltage over the life of the system.

FIG. 1 illustrates a simplified block diagram of a typical energetic firing device 100. The device 100 includes a power source 110, a system logic (e.g., controller) 120 and an energetic fire circuit 130. The power source 110 may be any type of power source that meets the requirements of the system (e.g., small size, small capacity, low voltage, low cost). The power source 110 may be non-replaceable, non-rechargeable and/or self-depleting. For example, the power source 110 may be a battery, coin cell, or solar cell. The power source 110 may be directly connected to the system logic 120 and the energetic fire circuit 130 and provide the power directly to each. In this configuration, the power source 110 must maintain sufficient voltage throughout the life of the device 100 to supply the fire circuit 130 with the required All-Fire voltage necessary to activate the fire circuit 130 when needed (when the FIRE signal is received from the system logic 120). The system logic 120 may control the operation of the device 100 and may be a single component or may be a plurality of components depending on what the device 100 is doing.

While the various components of the device 100 may all be designed to operate at same voltage (provided by the power source 110), the actual operational parameters may vary. For example, the system logic 120 may be capable of operating at a reduced voltage while the energetic fire circuit 130 requires the All-Fire voltage. By way of example, the device 100 may be designed with an operating voltage of 3V and the power source 110 may accordingly be 3V. The system logic 120 may be capable of operating at a lower voltage (e.g., 1.8V) while the All-Fire voltage required by the energetic fire circuit 130 may be the 3V operating voltage or much closer to that than the lower voltage required by the system logic 120. As such, the power source 110 needs to maintain as much of its capacity as possible during the life cycle thereof.

As with most of the electronic industry, electronic single shot devices are being forced in to smaller and smaller packages. This requires that not only must the components be reduced in size but also the power source 110 that supplies the power. Another prevailing design objective is to reduce cost. Reducing the capacity of the power source 110 may be one way to reduce the cost. A smaller power source 110 has less capacity, so it is imperative that the device properly manages this capacity to get the most out of the power source 110.

Furthermore, new designs are expected to increase the shelf life of the devices such that they will be expected to properly function after longer periods of being dormant with no periodic testing or maintenance. These design goals, smaller size, decreased cost, and longer shelf life, must be met without compromising the reliability requirements of the device.

BRIEF DESCRIPTION OF DRAWINGS

The features and advantages of the various embodiments will become apparent from the following detailed description in which.

DETAILED DESCRIPTION

One solution for maintaining the required All-Fire voltage may be to select a power source with a greater voltage than is required by the energetic fire circuit. Another solution is to connect two or more power sources in series to increase the voltage capacity. While these may be a viable solutions in some systems, the added size and cost may eliminate them from other designs. For systems with a small footprint, or cost sensitivity, these are not options. Furthermore, increasing the voltage via these methods could exceed the operating voltage of the system logic or force you into a different class of controllers for the system logic.

A boost circuit controlled by the system logic to increase the voltage provided to the energetic fire circuit when required is one way to ensure the All-Fire voltage is available without increasing the voltage capacity of the system/device. Such an arrangement may allow the device to run in a low power mode until the energetic firing circuit is required to be fired. The firing of the device is a one-time event so reduction in operating current caused by not providing the voltage to the energetic fire circuit until it is required is significant.

Figure 1:
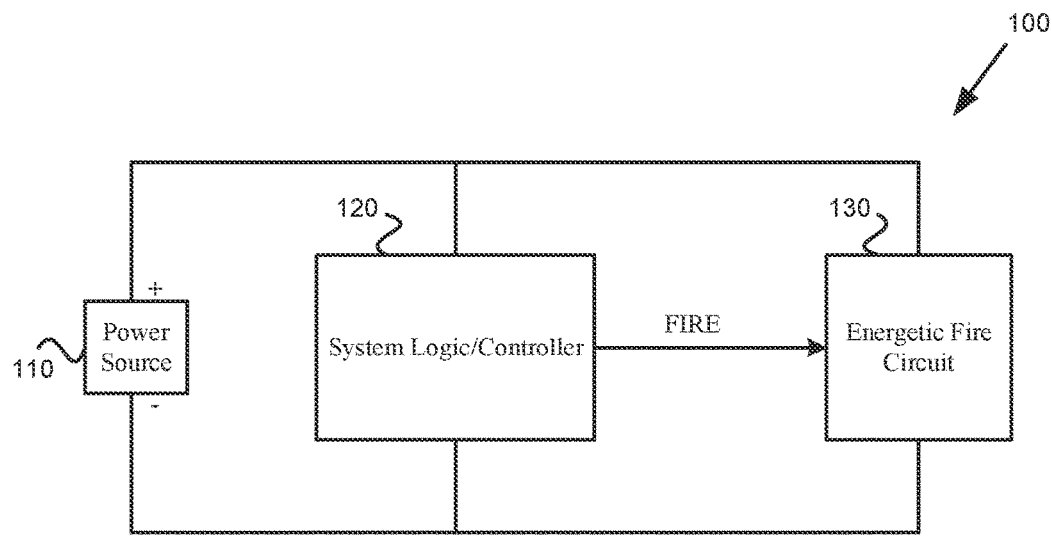
FIG. 1 illustrates a simplified block diagram of a typical energetic firing device.
Figure 2:
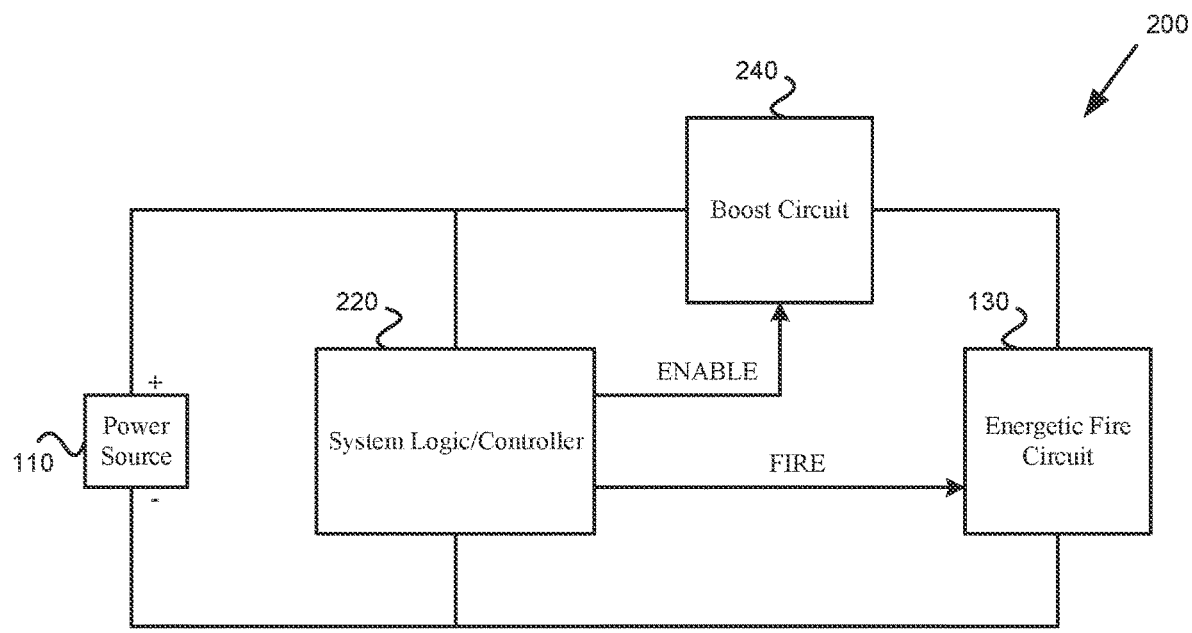
FIG. 2 illustrates a simplified block diagram of an example energetic firing device with a boost circuit to boost power source voltage to an All-Fire voltage, according to one embodiment.

FIG. 2 illustrates a simplified block diagram of an energetic firing device 200 to ensure an All-Fire voltage is available when required. The device 200 includes the power source 110, a system logic 220, the energetic fire circuit 130 and a boost circuit 240. The boost circuit 240 is placed between the power source 110 and the fire circuit 130. The boost circuit 240 is enabled by the system logic 220. That is, the system logic 220 will determine when the fire circuit 130 should be charged to the All-Fire voltage so that it is ready for initiation and will enable the boost circuit 240 accordingly. The boost circuit 240 may act as a switch to control the application of the voltage to the fire circuit 130 until it is required. When enabled, the boost circuit 240 is to increase the voltage provided by the power source 110 to at least the All-Fire voltage required by the fire circuit 130.

This topology has the advantage of allowing the system voltage to be lower than the All-Fire voltage required by the firing circuit 130 as well as reducing system power requirements as the fire circuit 130 is powered down until needed. Another advantage of the topology is that it extends the usable lifetime of the power source 110.

The use of the boost circuit 240 to power down the fire circuit 130 until needed increases the safety of the device 200. In order to initiate the fire circuit 130, the system logic 220 must enable the boost circuit 240 and then send the FIRE signal to the fire circuit 130. Accordingly, if the system logic 220 inadvertently sent the FIRE signal to the fire circuit 130 the fire circuit 130 would not inadvertently detonate as it would not be charged. The device 200 now requires two signals (enable and fire) before one can successfully initiate the fire circuit 130.

The boost circuit 240 must be enabled for a period of time to allow the fire circuit 130 to charge before the FIRE signal can be sent to the fire circuit 130. Otherwise, there will not be enough energy to activate the fire circuit 130 and initiate the device 200. The start-up time of the boost converter 240 may be a disadvantage when dealing with time sensitive applications.

According to one embodiment, the fire circuit 130 and the system logic 220 may communicate with one another including the fire circuit 130 providing information about its operation to the system logic 220. The system logic 220 can utilize the information received from the fire circuit 130 to add another level of safety and/or adjust the energy level provided by the boost circuit 240 or the timing of the FIRE signal. It should be noted that a bi-directional communications path between the fire circuit 130 and the system logic 220 is not illustrated for ease of illustration.

There are multiple ways to create the boost circuit 240. A common method would be to use a switching power supply configured as a boost converter. However, even the best power supply will require operating current thus impacting system life due to its own current requirements. Modern integrated circuits used in switching power supplies work very well over a broad range of voltages making it attractive to operate them directly from the power source 110. This reduction of components and subsystems in the switching power supply reduces the energy demands of the power source 110 which increases the useful life of the power source 110. However, even modern switching power supplies (e.g., controller chip) have a finite constant quiescent current draw which will impact capacity/life of the power source 110.

An advantage of using a controller chip switching power supply as the boost circuit 240 is that in addition to controlling the boost operation it can also regulate the output voltage. In some applications where a precise voltage is required the extra power consumption required to enable regulation of the voltage is a worth-while trade-off.

One way to address the constant current draw of the boost circuit 240, is to disconnect it from the power source 110 so that it is not always drawing current therefrom even when not active. Rather, a pulse train from the system logic could be utilized by the boost circuit to generate the All-Fire voltage required.

Figure 3:
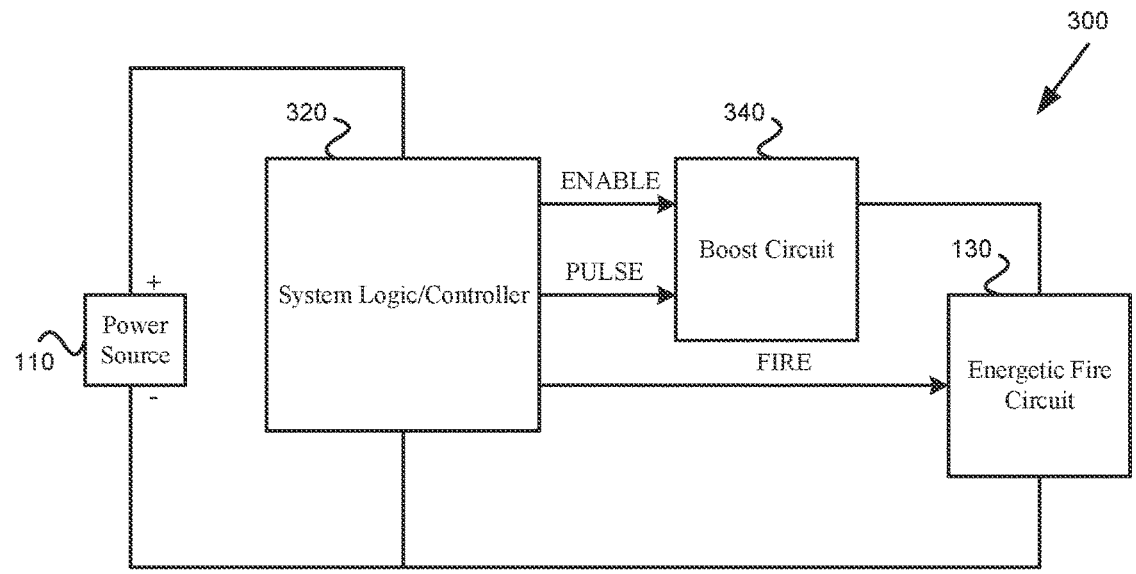
FIG. 3 illustrates a simplified block diagram of an example energetic firing device with a boost circuit to generate an All-Fire voltage from an enable signal and a pulse train, according to one embodiment.

FIG. 3 illustrates a simplified block diagram of an energetic firing device 300 to ensure an All-Fire voltage is available when required. The device 300 includes the power source 110, a system logic 320, the energetic fire circuit 130 and a boost circuit 340. The boost circuit 340 is not connected to the power source 110, rather it is placed between the system logic 320 and the fire circuit 130. The system logic 320 will determine when the fire circuit 130 needs to charged to the All-Fire voltage so that it is ready for initiation and will enable the boost circuit 340 (provide an enable signal) as well as provide the boost circuit 340 with a pulse train that it can utilize to generate at least the All-Fire voltage from the enable signal voltage. The pulse train provided by the system logic 320 may be a clock signal.

The use of the boost circuit 340 to provide power to the fire circuit 130 increases the safety of the device 300 for similar reasons to those advanced above with respect to the device 200. The boost circuit 340 must be enabled and receive the pulse train for a period of time to generate the at least the All-Fire voltage to charge the fire circuit 130 to the All-Fire voltage before the FIRE signal can be sent to the fire circuit 130 (which may be a disadvantage when dealing with time sensitive applications).

According to one embodiment, the fire circuit 130 and the system logic 320 may communicate with one another (bi-directional communications path not illustrated for ease of illustration). The system logic 320 can utilize information received from the fire circuit 130 to add another level of safety, adjust the pulse train provided to the boost circuit 340 to adjust (regulate) the voltage generated by the boost circuit 340 or the timing of the FIRE signal.

According to one embodiment, the boost circuit 340 may be a controller chip switching power supply. An advantage of using a controller chip switching power supply as the boost circuit 240 is that in addition to controlling the boost operation it can also regulate the output voltage which is advantageous for certain systems. The regulation of the voltage by the boost circuit 240 may be provided all the time or after some system criteria (e.g., external condition) is met. If voltage regulation is active, the time required to obtain the regulated voltage output may be an issue for time sensitive applications.

According to one embodiment, for implementations where a specific voltage output is not required but rather simply a voltage above the All-Fire voltage, the boost circuit may be implemented as a capacitive voltage multiplier.

Figure 4:
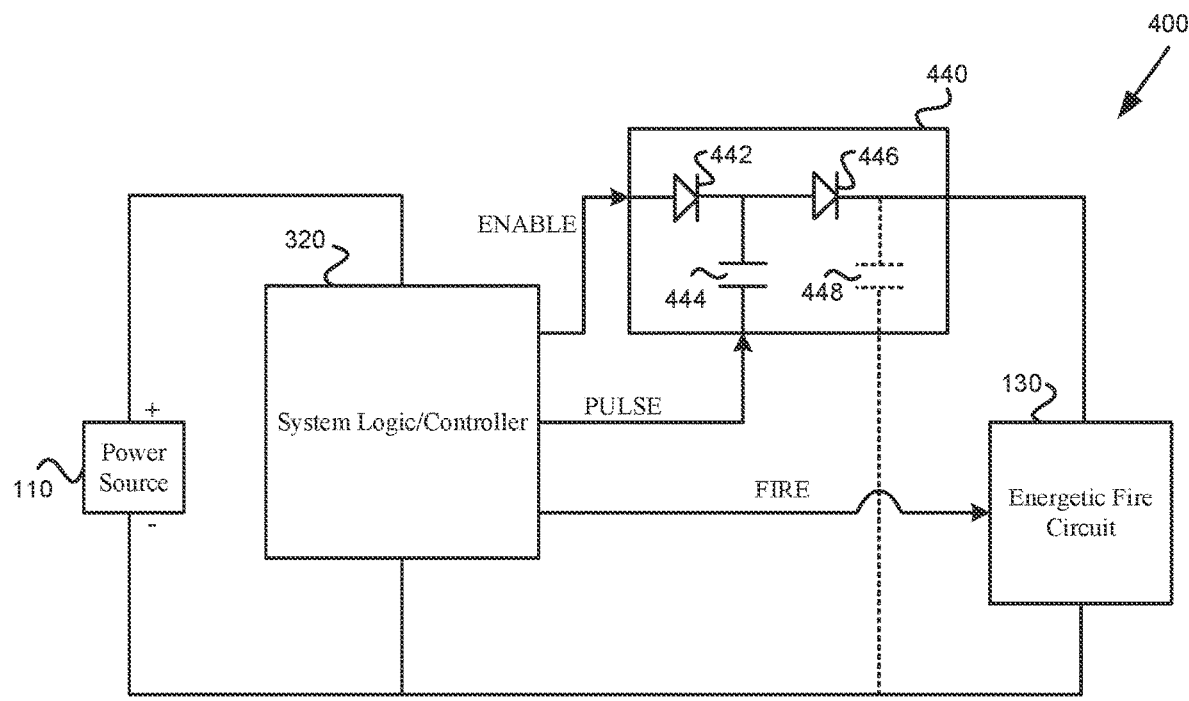
FIG. 4 illustrates a simplified block diagram of an example energetic firing device with a capacitive voltage multiplier to generate an All-Fire voltage from an enable signal and a pulse train, according to one embodiment.

FIG. 4 illustrates a simplified block diagram of an energetic firing device 400 to ensure an All-Fire voltage is available when required. The device 400 includes the power source 110, the system logic 320, the energetic fire circuit 130 and a capacitive voltage multiplier boost circuit 440. The capacitive voltage multiplier boost circuit 440 is a small and inexpensive solution that is useful when output voltage regulation is not critical. As illustrated, the capacitive voltage multiplier boost circuit 440 includes a first diode 442, a first capacitor 444, a second diode 446 and a second capacitor 448. The first diode 442 is connected to an enable pin from the system logic 320 and the first capacitor 444 is connected to a pulse train pin from the system logic 320. As one skilled in the art would recognize, when the enable pin is active and the pulse train is received, the capacitive voltage multiplier boost circuit 440 will approximately double the voltage of the enable signal. It should be noted that the capacitive voltage multiplier boost circuit 440 is in no way intended to be limited thereto. Rather, additional stages (diodes and capacitors) could be added to further increase the approximate multiplication factor.

It should be noted that the second capacitor 448 is illustrated as being part of the boost circuit 440 (as it is required to complete the capacitive voltage multiplier). However, the second capacitor 448 would likely be the charge capacitor in the fire circuit 130 holding the All-Fire voltage rather than be part of the boost circuit 440 as illustrated. If the capacitive voltage multiplier were more than approximately doubling the enable signal voltage it would be the last capacitor that could be included in the fire circuit 130 (e.g., third capacitor for approximately tripling the enable signal voltage, fourth capacitor for approximately quadrupling the enable signal voltage).

Although the disclosure has been illustrated by reference to specific embodiments, it will be apparent that the disclosure is not limited thereto as various changes and modifications may be made thereto without departing from the scope. The various embodiments are intended to be protected broadly within the spirit and scope of the appended claims.

The invention claimed is:

1. A one-shot energetic firing device to detonate when appropriate to initiate an action, wherein the device is destroyed upon detonation, the device comprising
   a power source to provide an operating voltage;
   a system logic to control operation of the device;
   an energetic fire circuit configured to detonate when charged to an all-fire voltage required for detonation and provided with a fire signal from the system logic, wherein the all-fire voltage is greater than the system operating voltage; and
   a boost circuit to generate the all-fire voltage and provide to the energetic fire circuit when enabled by the system logic in order to charge the energetic fire circuit to the all-fire voltage.

2. The device of claim 1, wherein the energetic fire circuit is not powered until preparing for detonation.

3. The device of claim 1, wherein the power source is a battery.

4. The device of claim 1, wherein the power source is a solar cell.

5. The device of claim 1, wherein the system logic is a controller.

6. The device of claim 1, wherein the boost circuit is located between the power source and the energetic fire circuit and coverts the operating voltage to the all-fire voltage.

7. The device of claim 6, wherein the boost circuit is a switching power supply.

8. The device of claim 1, wherein
   the boost circuit is located between the system logic and the energetic fire circuit,
   the system logic provides an enable signal and a pulse train to the boost circuit, and
   the boost circuit utilizes the pulse train to generate the all-fire voltage from a voltage of the enable signal.

9. The device of claim 8, wherein the boost circuit is a switching power supply capable of regulating the all-fire voltage.

10. The device of claim 8, wherein the energetic fire circuit provides feedback to the system logic that the system logic utilizes to control the boost circuit.

11. The device of claim 8, wherein the boost circuit is a capacitive voltage multiplier.

12. The device of claim 8, wherein the pulse train is a clock signal.

13. A one-shot energetic firing device to detonate when appropriate to initiate an action, wherein the device is destroyed upon detonation, the device comprising
   a power source to provide a system operating voltage;
   a system logic to control operation of the device;
   an energetic fire circuit configured to detonate when charged to an all-fire voltage required for detonation and provided with a fire signal from the system logic, wherein the all-fire voltage is greater than the system operating voltage; and
   a boost circuit located between the system logic and the energetic fire circuit to generate and provide the all-fire voltage to the energetic fire circuit when enabled by the system logic in order to charge the energetic fire circuit to the all-fire voltage, wherein the system logic enables the boost circuit by providing an enable signal and a pulse train thereto and the boost circuit utilizes the pulse train to generate the all-fire voltage from a voltage of the enable signal.

14. The device of claim 13, wherein the boost circuit is a switching power supply capable of regulating the all-fire voltage.

15. The device of claim 13, wherein the boost circuit is a capacitive voltage multiplier.

16. The device of claim 13, wherein the energetic fire circuit provides feedback to the system logic regarding charge status.

17. A one-shot energetic firing device to detonate when appropriate to initiate an action, wherein the device is destroyed upon detonation, the device comprising
   a system logic to control operation of the device;
   a power source to provide an operating voltage to the system logic;
   a boost circuit configured to generate an all-fire voltage that is greater than the operating voltage when enabled by the system logic, wherein the system logic enables the boost circuit by providing an enable signal and a pulse train thereto and the boost circuit utilizes the pulse train to generate the all-fire voltage from a voltage of the enable signal; and
   an energetic fire circuit configured to be charged to the all-fire voltage by the boost circuit and to detonate once charged and upon receipt of a fire signal from the system logic.

18. The device of claim 17, wherein the energetic fire circuit informs the system logic regarding its charge status.

19. The device of claim 17, wherein the boost circuit is a switching power supply capable of regulating the all-fire voltage.

20. The device of claim 17, wherein the boost circuit is a capacitive voltage multiplier.

* * * * *